United States Patent
Benjamin et al.

(10) Patent No.: US 11,308,563 B2
(45) Date of Patent: Apr. 19, 2022

(54) ENERGY PROGRAM COMMUNICATION CONTROL SYSTEM AND METHOD BASED ON LOAD SHAPE ANALYSIS

(71) Applicant: ORACLE INTERNATIONAL CORPORATION, Redwood Shores, CA (US)

(72) Inventors: Oren Benjamin, Arlington, VA (US); Ben Packer, Redwood City, CA (US); Justine Kunz, San Francisco, CA (US); Erik Shilts, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 556 days.

(21) Appl. No.: 15/886,083

(22) Filed: Feb. 1, 2018

(65) Prior Publication Data
US 2019/0236725 A1   Aug. 1, 2019

(51) Int. Cl.
*G06Q 50/06* (2012.01)
*G06N 5/02* (2006.01)
(Continued)

(52) U.S. Cl.
CPC ....... *G06Q 50/06* (2013.01); *G06F 16/24575* (2019.01); *G06F 16/5854* (2019.01);
(Continued)

(58) Field of Classification Search
CPC .... G06Q 50/06; G06Q 30/02; G06Q 30/0202; Y02B 70/3225; Y02B 70/30; Y04S 20/222; Y04S 50/14
See application file for complete search history.

(56) References Cited

U.S. PATENT DOCUMENTS 9,171,256 B2 * 10/2015 Mohagheghi ............. H02J 3/14
2010/0070102 A1 * 3/2010 Benes ..................... H04L 67/10
700/296
(Continued)

OTHER PUBLICATIONS

Borgeson, S. D. (2013). Targeted efficiency: Using customer meter data to improve efficiency program outcomes (3686197). Available from ProQuest Dissertations and Theses Professional. (1667442823). Retrieved from https://dialog.proquest.com/professional/docview/1667442823?accountid=131444 (Year: 2013).*
(Continued)

*Primary Examiner* — Michael P Harrington
(74) *Attorney, Agent, or Firm* — Kraguljac Law Group, LLC

(57) ABSTRACT

Systems, methods, and other embodiments associated with predicting energy efficiency program participation are described. Embodiments of a method include obtaining load data for an energy customer, and determining an empirical load shape for the energy customer based on the obtained load data. A defined load shape that most closely matches the empirical load shape is selected for the energy customer. A data structure is generated to include the defined load shape, demographic data and/or site parcel data. It is determined that the energy customer is more likely to participate in an energy efficiency program than a different energy customer by applying a trained predictive model to the data structure. Transmission of information about the energy efficiency program is controlled by assigning a higher priority to a transmission to the energy customer than to a second transmission to the different energy customer.

15 Claims, 3 Drawing Sheets

(51) Int. Cl.
    *G06N 20/00* (2019.01)
    *G06F 16/583* (2019.01)
    *G06F 16/2457* (2019.01)
    *G06Q 10/06* (2012.01)
    *G06Q 30/02* (2012.01)
    *G06Q 10/04* (2012.01)

(52) U.S. Cl.
    CPC ............. *G06N 5/022* (2013.01); *G06N 20/00* (2019.01); *G06Q 10/04* (2013.01); *G06Q 10/06375* (2013.01); *G06Q 30/0202* (2013.01); *G05B 2219/2639* (2013.01)

(56) References Cited

U.S. PATENT DOCUMENTS

| | | | |
|---|---|---|---|
| 2012/0095794 A1 | 4/2012 | Guthridge | |
| 2015/0046130 A1 | 2/2015 | Fei et al. | |
| 2015/0081384 A1* | 3/2015 | Zeifman | G06Q 30/0202 |
| | | | 705/7.31 |
| 2015/0161233 A1* | 6/2015 | Flora | G06F 16/285 |
| | | | 707/737 |
| 2017/0178256 A1 | 6/2017 | Albert et al. | |
| 2017/0308973 A1* | 10/2017 | Hirata | H02J 13/00034 |

OTHER PUBLICATIONS

Smith, et al., A Simple Way to Use Interval Data to Segment Residential Customers for Energy Efficiency and Demand Response Program Targeting; pp. 5-374 thru 5-386; 2012; from ACEEE Summer Study on Energy Efficiency in Buildings.

York, et al., Expanding the Energy Efficiency Pie: Serving More Customers, Saving More Energy Through High Program Participation; pp. 1-104; Jan. 2015, American Council for an Energy-Efficient Economy, Washington, DC.

Patent Cooperation Treaty (PCT) International Search Report and Written Opinion in co-pending PCT International Appl. No. PCT/US2019/015512 (International Filing Date of Jan. 29, 2019) dated Apr. 15, 2019 (15 pgs.).

* cited by examiner

ENERGY PROGRAM COMMUNICATION CONTROL SYSTEM AND METHOD BASED ON LOAD SHAPE ANALYSIS

BACKGROUND

Utility companies and other entities offer a variety of energy efficiency programs that aim to motivate customers to consume energy efficiently. Each such program will have different measures offered as incentives to the energy customers. For example, financial incentives or other money-saving measures may be offered to purchasers of efficient electric appliances under an energy-efficient appliance program. More specifically, an electric utility company may offer a rebate directly to consumers of energy-efficient appliances to offset a portion of a premium typically charged by retailers for energy-efficient appliances. Electric utility companies may offer a discounted rate charged for electricity supplied to homes where energy customers who purchase such energy-efficient appliances reside. Government tax credits may also be available to customers who purchase energy-efficient appliances.

With so many programs available, and such a variety of different measures offered under those programs, utility companies lack a practical way to inform energy customers about the available programs. Further, utility companies have traditionally been unable to distinguish their energy customers who are likely to participate in certain energy-efficiency programs, from those who are unlikely to participate. Computer systems may permit data records for energy customers to be sorted, or grouped into classes based purely on generalized data identifying a type of structure that is identified in the data records for the energy customers. For example, energy customers can be grouped into a subgroup of customers that reside in a single family home and a subgroup of customers that reside in a multi-family apartment building. However, the propensity of customers within each such subgroup to participate in an energy efficiency program may vary widely. As a result, conventional computer systems have been unable to filter data records within a general classification for energy customers who are likely to participate in an energy efficiency program from those who are unlikely to participate to control communications regarding such programs. Instead, information about all available programs has traditionally been sent via electronic or physical communication channels to all energy customers. Transmitting information about all programs to all energy customers wastes computational and network resources for electronically-transmitted information (e.g., email, push notifications, etc.). Transmitting information about all programs to all energy customers wastes natural resources and money for physically-transmitted information (e.g., via postal service, etc.). And regardless of the mode of transmission, inundating energy customers with information about inapplicable energy efficiency programs is likely to irritate those energy customers. Irritated energy customers may disregard all such information received in the future, even if the information pertains to programs for which those energy customers qualify.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
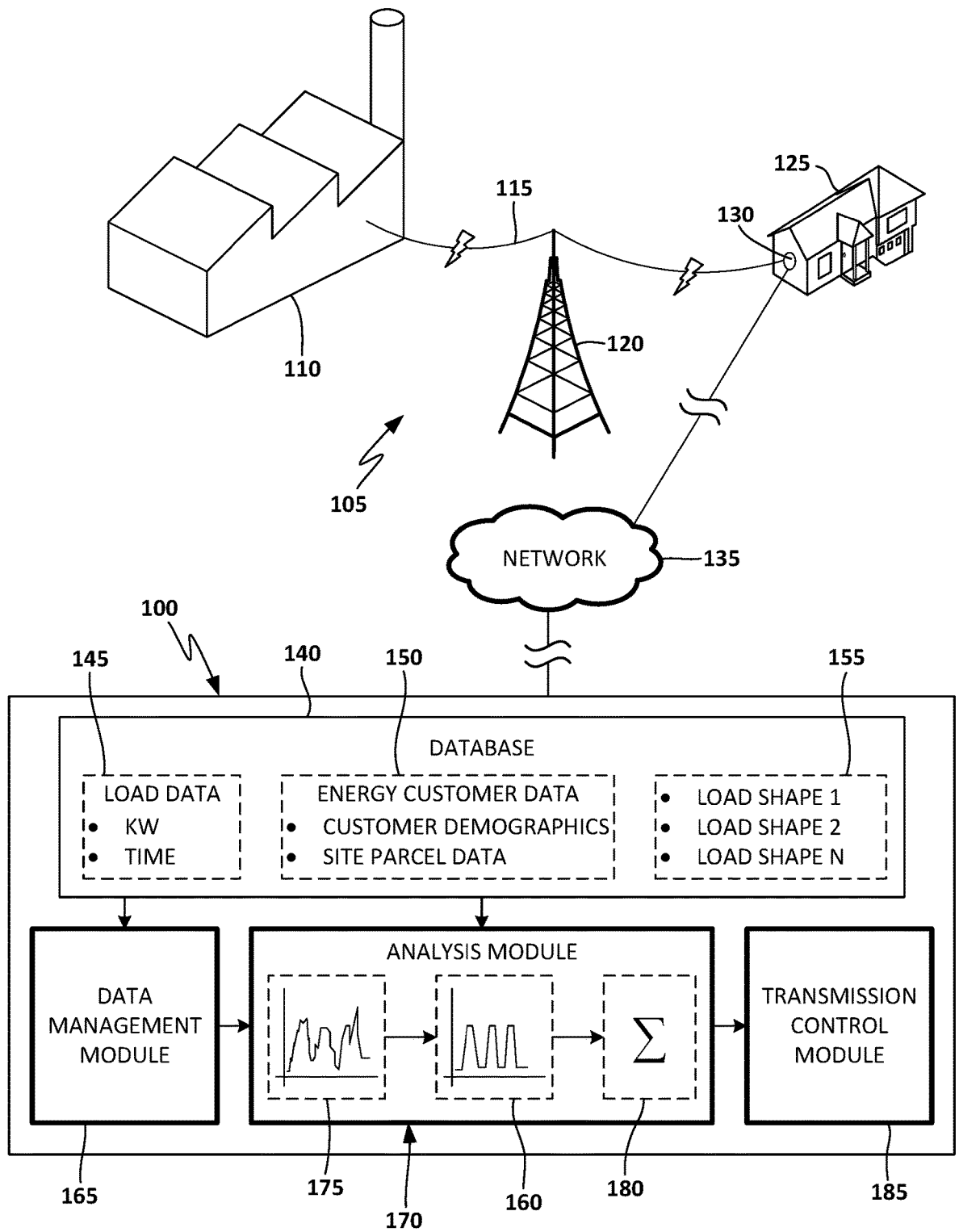
FIG. 1 schematically illustrates an embodiment of an energy distribution network including a computing system for predicting energy customer participation in an energy efficiency program.

Computerized systems and methods are described herein that manipulate data records for energy customers to identify load shapes representing measured energy consumption patterns in the data records. Each identified load shape is matched to an established load shape that most accurately represents the energy consumption pattern in the respective data record. A predictive model linked to the established load shape that most accurately represents the energy consumption pattern is applied to information in the data record. Application of the predictive model results in a designation of the data record as being associated with an energy customer who is likely to participate in an energy efficiency program, or associated with an energy customer who is unlikely to participate. These data records can be filtered to limit the transmission of information about the energy efficiency programs to the energy customers with at least a threshold propensity to participate.

Historically, utility companies have relied on manufacturers and retailers of energy saving appliances to offer those products to energy customers using energy efficiency as a selling point. Otherwise, utility companies have instituted their own informational campaigns using traditional approaches such as blanket mailing physical materials to all energy customers. However, such approaches have exhibited limited effectiveness.

In an effort to address at least some of the above shortcomings, the present disclosure involves a computer-implemented technique and algorithm that includes supervised machine learning to "train" a predictive model. The trained predictive model seeks to distinguish between data records associated with energy customers who have a propensity to participate in an energy efficiency program and data records associated with energy customers who are unlikely to participate. The predictive model is trained using a training set of data that includes collected data such as prior participation data, available demographic and site parcel data, and/or energy consumption data measured with smart meter or other meter for each energy customer in the training set. The training set includes data records for both energy customers who are known to have participated, and energy customers who are known to have not participated, in the specific energy efficiency program for which the predictive model is being trained. The relative proportions of data records for energy customers known to have participated, and for energy customers who are known to have not participated can be approximately the same as that in the underlying dataset. Trained in this manner, the predictive model can be applied to data records for energy customers not in the training set, and having an unknown propensity to participate in the energy efficiency program. Thus, the trained predictive model can predict whether the other, non-participating energy customers are likely to participate in such a program in the future.

Training involves developing a model that distinguishes between data records for energy customers who are likely to participate in an energy efficiency program from data records for energy customers who are unlikely to participate based, at least in part, on one or more of: an empirically-determined load shape of dwellings associated with the energy customers; information about the dwellings such as the square footage, heat type (e.g., forced air, hot water, heat pump, etc.), the condition of the dwelling, etc.; demographic information of the energy customers; and a prior participation history of the energy customers. One embodiment involves developing a model that distinguishes between data records for energy customers who are likely to participate from data records for energy customers who are unlikely to participate based, at least in part, on a combination of: (i) an empirically-determined load shape of dwellings associated with the energy customers; and (ii) information about the dwellings such as the square footage, heat type (e.g., forced air, hot water, heat pump, etc.), the condition of the dwelling, etc. The empirically-determined load shapes may be categorized into a closest matching load shape out of a plurality of defined load shapes, and the predictive model trained using the defined load shapes. A predictive model can be separately trained for energy efficiency programs that are specific to one or more of: dwelling type, demographic information and prior participation history by using corresponding training sets of data.

Once trained, the predictive model can be applied to rank and/or filter the data records of non-participants according to the predicted propensity of the non-participants to participate in the energy efficiency program in the future. Non-participants are energy customers who are eligible to participate in an energy efficiency program, but are not currently participating. To apply the predictive model, the daily energy usage pattern in the data record for the energy customer is characterized as one of a small number, but more than one, of established load shapes. Characterization involves finding the established load shape that most-closely matches the empirical load shape. The established load shapes can be defined in a database, and include a generic representation of the N most-commonly occurring load shapes, where N can be any positive integer value greater than one (1) (e.g., N can equal 2, 3, 4, 5, 6, 7, 8, etc.). The predictive model that was trained is then applied to the data for the non-participants, using the established load shape that most-closely matches the empirical load shape as a variable of the predictive model. Thus, the predictive model uses the closest-matching established load shape as one variable. One or more additional variables such as the information about the dwellings, heat type, the condition of the dwelling, etc., is/are also input to the predictive model to discriminate between non-participants who are likely to participate and non-participants who are unlikely to participate.

Use of the daily load shape of energy customers to train the predictive model has shown significant predictive capacity beyond that of other features. Targeting information about energy efficiency programs to a smaller subset (e.g., less than all) of energy customers that is predicted to be more likely to participate than those outside of the subset, a utility company can conserve resources. Further, the utility company can reduce marketing costs and the cost to customer satisfaction that comes from receiving irrelevant or unwelcome marketing.

With reference to FIG. 1, an illustrative embodiment of a system 100 associated with analyzing data records for predicting energy customer participation in an energy efficiency program is illustrated. The system 100 is shown and described herein for use with an electric power distribution system 105 for the purpose of clearly describing the present technology. However, the system 100 can be utilized in association with any other utility or consumable product supplier such as a natural gas distribution system, for example.

The electric power distribution system 105 includes a station 110 that can be a generation station, substation, distribution point or any other supplier of electricity operated by, or on behalf of an electric utility. A network including transmission lines 115 supported by one or more towers 120 conducts electricity between the station 110 and a dwelling 125 associated with an energy customer. The network can include other transmission devices such as transformers, switches, etc., but such devices have been omitted from FIG. 1 for the sake of clarity. Further, the dwelling 125 is shown as a single-family residential home, but other examples of the dwelling 125 include: any single-family or multi-family residential home, condominium, apartment, etc.; a commercial office building; a retail store; an industrial plant; a government building; or any other structure that is associated with an energy customer and supplied with electric energy by the electric utility.

The dwelling 125 is equipped with a meter 130 that measures a quantity of electric power consumed by the dwelling 125 over time. An embodiment of the meter 130 can be a so-called "smart meter." A smart meter includes a network communication module (not shown) that occasionally, optionally at regular intervals such as monthly, quarterly, etc., transmits data over a communication network 135. The communication network 135 can include a wide area network ("WAN") such as the Internet, a local area network ("LAN") including residential or local networking devices such as wireless routers and switches, a modem, etc., or a combination of a WAN and a LAN.

The transmitted data can be data that is used to accurately invoice the energy customer associated with the dwelling 125 for the actual quantity of power consumed at the dwelling 125. The transmitted data can also optionally be stored in a database 140 that is accessible by the system 100. Data transmitted by the smart meter includes, but is not limited to a portion of, and optionally all load data 145 that is indicative of a quantity of electric power consumed by the energy customer at the dwelling 125 at different times. For example, the data transmitted by the smart meter can include data that expressly identifies, or data that can be used to determine, the total power consumed during a week, day, hour, etc.; the length of time over which power consumption is reported such as a month, quarter, etc.; kilowatt-hours; and the like.

For embodiments of the meter 130 that may lack the ability to transmit the data over the communication network 135, the data that would be transmitted via the communication network 135 by a smart meter can be manually read and recorded in the database 140. Whether the data is transmitted over the communication network 135 or manually recorded in the database 140, the data can be associated with data records corresponding to different energy customers.

In one embodiment, the system 100 is a computing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the system 100 is a centralized server-side application that provides at least the functions disclosed herein and that is accessed by many users via computing devices/terminals communicating with the system 100 (functioning as the server) over a computer/communication network 135.

In one embodiment, one or more of the components described herein are configured as program modules stored in at least one non-transitory computer readable medium. The program modules are configured with stored instructions that when executed by at least a processor cause the computing device to perform the corresponding function(s) as described herein.

The system 100 of FIG. 1 includes the database 140 that stores at least a portion of the data used by the system 100 as described herein. The database 140 can reside on a non-transitory computer-readable medium, or include data that is stored by a non-transitory computer-readable medium array, made up of a plurality of storage devices. According to yet other embodiments, the information included in the database 145 described with reference to the illustrated embodiment can be acquired from a plurality of different databases. Further, any portion of the data included in the database 140 and utilized by the system 100 can optionally be acquired from a remote database that is external to the system 100, and does not form a portion of the system 100. Such an external database can be accessible by the system 100 via the communication network 135 or a local data communication link. For the sake of brevity, the database 140 shown in FIG. 1 is described herein as including the data utilized as factors by the system 100 to predict the propensity of an energy customer to participate in an energy efficiency program. Such a prediction is achieved by applying a trained predictive model to a data record associated with the energy customer.

Among the data included in a data record in the database 140 is the load data 145. The load data 145 is indicative of electric power consumed by the energy customer at the dwelling 125, at different times. The load data 145 can be utilized by the system 100 to determine the total power consumption by the energy customer at the dwelling 125, in kilowatt-hours on a daily basis, for example, for each of a plurality of different days within a period of time (e.g., over a monthly period, a three-month period, etc.).

The database 140 also includes customer data 150 that is specific to the dwelling 125 and/or the energy customer associated with the data record. For example, in one embodiment, the customer data 150 can include one or more of, or combinations of, the following types of data that may be part of data records corresponding to the dwelling 125:

Demographic data available to the electric utility. For instance, the demographic data can include the number of adults residing in the dwelling 125 associated with the energy customer, the number of children residing in the dwelling 125 associated with the energy customer, whether the energy customer owns or rents the dwelling 125, etc.

Site parcel data or other data describing features of the dwelling 125. For example, the site parcel data can include the square footage, the number of floors, or other indication about the size of the dwelling 125 associated with the energy customer. The type of heat (e.g., electric, gas, fuel oil, wood, etc.) used to heat the dwelling 125 during cold seasons, the dwelling type (e.g., single family home, multi-family apartment complex, etc.) can also be included in the site parcel data.

Miscellaneous data that could be useful in predicting an energy customer's propensity to participate in the energy efficiency program could also be included in the customer data 150. For example, the number of other programs and/or measures in which the energy customer is already a participant (excluding the program of interest) may be stored as customer data 150 in the database 140. The historical participation (or lack thereof) of the energy customer in energy efficient programs and/or measures may a useful indicator of whether the energy customer is generally receptive to such programs and/or measures.

A library 155 comprising a plurality of established load shapes is also included in the database 140. Electric load is the total electrical power used by the dwelling 125 for a given time (e.g., in real-time, for a specific hour, for a day, etc.). The electric load changes with time in response to changes in the operation of electric devices such as lights, heating, ventilating, air conditioning equipment, computer and office equipment, furnaces and other industrial equipment, etc. The electric load may be represented by measured data that defines a graphical curve, other line graph, plot or other graphical representation as a function of time. The curve represents the load shape, and graphically reveals patterns of electric power consumption.

Each established load shape in the library 155 is a data structure that defines a generalized representation of a load shape that is expected to be exhibited (e.g., based on prior observed data) by one or more particular types of dwelling 125. Being a generalized representation, the established load shapes may not accurately reflect an empirical load shape created based on actual electric power consumption data such as load data 145. Instead, the generalized shape can be of a form that shows an ideal load shape having a smoothed pattern exhibiting characteristics distinctive of the power consumption patterns of different buildings.

For example, a regular, repeating daily load shape 160 having equally-spaced rectangular peaks as shown in FIG. 1 may be indicative of an office building that is closed on weekends. Electric power consumption is generally uniform at a high level during the work week (e.g., Monday-Friday), hence the rectangular peaks. On weekends, when the office building is closed, electric power consumption is generally uniform at a low level, forming the troughs between the rectangular peaks. Thus, the load shape 160 can be associated with dwellings 125, such as office buildings and schools, for example, that are closed on weekends but used during regular hours during the week.

Conversely, the established load shape for a residential house with two adults who work regular business hours during the day (e.g., 8:00 AM-4:30 PM) may be the inverse of the load shape 160. During the work weeks (Mondays-Fridays), the consumed electric power is generally uniform at a low level while the house is vacant, resulting in troughs for work days. On weekends, when the resident adults may be home longer during the day, electric power consumption is generally uniform at a high level, forming rectangular peaks for weekend days between the troughs. Different established load shapes can be included in the library 155 to represent other common load shapes.

Although the embodiment of the load shape 160 is described as a weekly load shape, the present disclosure is not so limited. Another embodiment of the load shape 160 is a daily load shape. Instead of a curve of power consumed versus time (e.g., sampled at a daily frequency) over the course of a week, the daily load shape is a curve of power consumed versus time over the course of a twenty four (24) hour day. Thus, the sampling frequency of a daily load curve can be much higher than one sample recorded every day. For example, the daily load shape can be shown as power consumed on a scale of seconds, minutes or hours. Further, the daily load shape can be compared to established load shapes having patterns specific to weekdays, specific to weekends, and based on overall use depending on the day for which the empirical load shape is generated. For example, an empirical load shape for a weekday can be compared to established load shapes specific to weekdays. Likewise, a load shape for power consumed during a weekend day can be compared to an established load shape specific to a weekend day.

To ensure the availability of a sufficient sample size of data used to train the predictive models, the number of established load shapes in the library 155 can be limited. For instance, the number can be limited to a number that is less than a number of all known load shapes. In one embodiment, the library 155 can be limited to include N of the most-commonly occurring load shapes, where N can be any positive integer value greater than one (1) (e.g., N can equal 2, 3, 4, 5, 6, 7, 8, etc.). Each established load shape may be associated with a type of day (e.g., weekday, weekend, etc.), a category of week (e.g., season, holiday, etc.). In other words, the empirical load shape can be compared to different established load shapes specific to different periods of time, and the different established load shapes input to the predictive model, as appropriate.

The system 100 also includes a data management module 165. The data management module 165 serves as an interface with the database 140. At least load data 145 corresponding to the energy customer can be obtained from the database 140 by the data management module 165. However, other information such as customer data 150 and/or an established load shape in the library 155 can also be obtained by the data management module as described herein.

An analysis module 170 uses data obtained by the data management module 165, including the load data 145 for the energy customer, to determine and generate an empirical load shape 175 for the energy customer based on the obtained load data 145. The empirical load shape 175 represents the pattern of actual power consumption by the energy customer over a period of time, as measured by the meter 130. As one example, the empirical load shape 175 can represent the daily power consumption at the dwelling 125 associated with the energy customer over the course of a month. The analysis module 170 then identifies an established load shape from a set of stored load shapes, such as load shape 160 in FIG. 1 for example, in the library 155 that most closely matches the empirical load shape 175. This established load shape 160 that is the closest match is selected by the analysis module 170 to be what is referred to hereinafter as a "defined load shape 160." The defined load shape 160 is to be used by the system 100 to determine the appropriate predictive model 180 that will be applied by the system 100 to a data structure corresponding to the energy customer. The result of applying the predictive model to the data structure of the energy customer determines the propensity of the energy customer to participate in an energy efficiency program.

The predictive model may be trained using a training set of data for energy customers falling into each of the various different established load shapes. As an example, the full population of energy customers to be included in a training set of data is broken down into a plurality of subsets. Each subset can include energy customers whose daily or other periodic load shape falls into a different one of the plurality of established load shapes. The load shape for each of the energy customers in the training set of data can be categorized into the subset corresponding to the closest matching load shape, among the N different established load shapes. A data structure such as a feature vector for each energy customer can be created to include the closest matching established load shape, along with other information such as information about the dwelling, heat type, dwelling condition, etc. associated with the energy customer.

Each feature vector is assigned a binary label indicating whether or not the respective energy customer is a participant in the program or measure of interest. The program or measure of interest is the program or measure for which the likelihood of the energy customer's participation is being predicted. A logistic regression analysis can be performed using the feature vectors for each of the subsets to develop a logistic regression model or other suitable algorithm as the predictive model. For example, the trained predictive model can be a binary classifier that classifies the energy customer into one of two classes: (i) a class of customers who are likely to participate in the energy efficiency program, or (ii) a class of customers who are unlikely to participate in the energy efficiency program. Regardless of the type of predictive model, any scalar values, error constants, formula structure, etc. of the predictive model should distinguish between the feature vectors having the different binary labels with a reasonable degree of accuracy. Accordingly, the predictive model can be trained to be a function of the established load shapes, and at least one other input variable such as information about the dwelling, demographic data, heat type, dwelling condition, etc. associated with the energy customer.

After the initial training of the predictive model is complete, continued refinement can occur. As predictions are made for energy customers using the trained predictive model, scalar values, error constants, or even the structure of the predictive model can be modified from the result of initial training. The predictions resulting from use of the predictive model and data indicating whether the energy customers ultimately elected to participate in the energy efficiency program can be used to update the predictive model.

The analysis module 170 generates a data structure for the energy customer to predict that energy customer's propensity to participate in the energy efficient program. The generated data structure can be a vector that includes at least demographic data and/or site parcel data corresponding to the energy customer or the dwelling 125 associated with the energy customer. The trained predictive algorithm 180 obtained from the database 140 is applied to the data structure to determine the propensity of the energy customer to participate in an energy efficiency program. The prediction result can be embodied in a data structure output by the analysis module 170.

A transmission control module 185 of the system 100 receives the prediction result and, based on the prediction result, controls transmission of information about the energy efficiency program. Controlling the transmission of the information can involve updating or otherwise modifying the database 140 to tag a data record associated with the energy customer with a propensity designation. For example, if the prediction result indicates that the energy customer is more likely to participate in an energy efficiency program than a different energy customer, the transmission control module 185 can designate the energy customer as a recipient of the information. The updated record with this designation can subsequently identified by searching the data records for the tag and can be accessed by a system separate from the system 100. The identified data records with the tag are thus identified as recipients to whom an electronic message including the information about the energy efficiency program should be transmitted.

An electronic transmission of the electronic message can be addressed to an email address, a number at which a text can be received, or other electronic contact information of the energy customer. This electronic transmission can then be transmitted via the communication network 35 based on the designation of the energy customer as a recipient. According to other embodiments, the separate system can access the updated record and address a letter, brochure, invoice or other physical correspondence including the information about the energy efficiency program based on the designation in the in updated record. According to other embodiments, the separate system can access the updated record and control what content is presented to the energy customer when the energy customer logs into a user account with the utility company to pay an invoice, for example.

Regardless of the manner of transmission, the transmission of such information to the energy customer can be prioritized over the transmission of such information to a different energy customer. The different energy customer may have had a predicted propensity to participate in the energy efficiency program that was lower than a threshold value, or at least lower than the predicted propensity of the energy customer. For such embodiments, the transmission control module 185 may output, modify or otherwise update a data structure that prevents transmission of the information about the energy efficiency program to the different energy customer.

Figure 2:
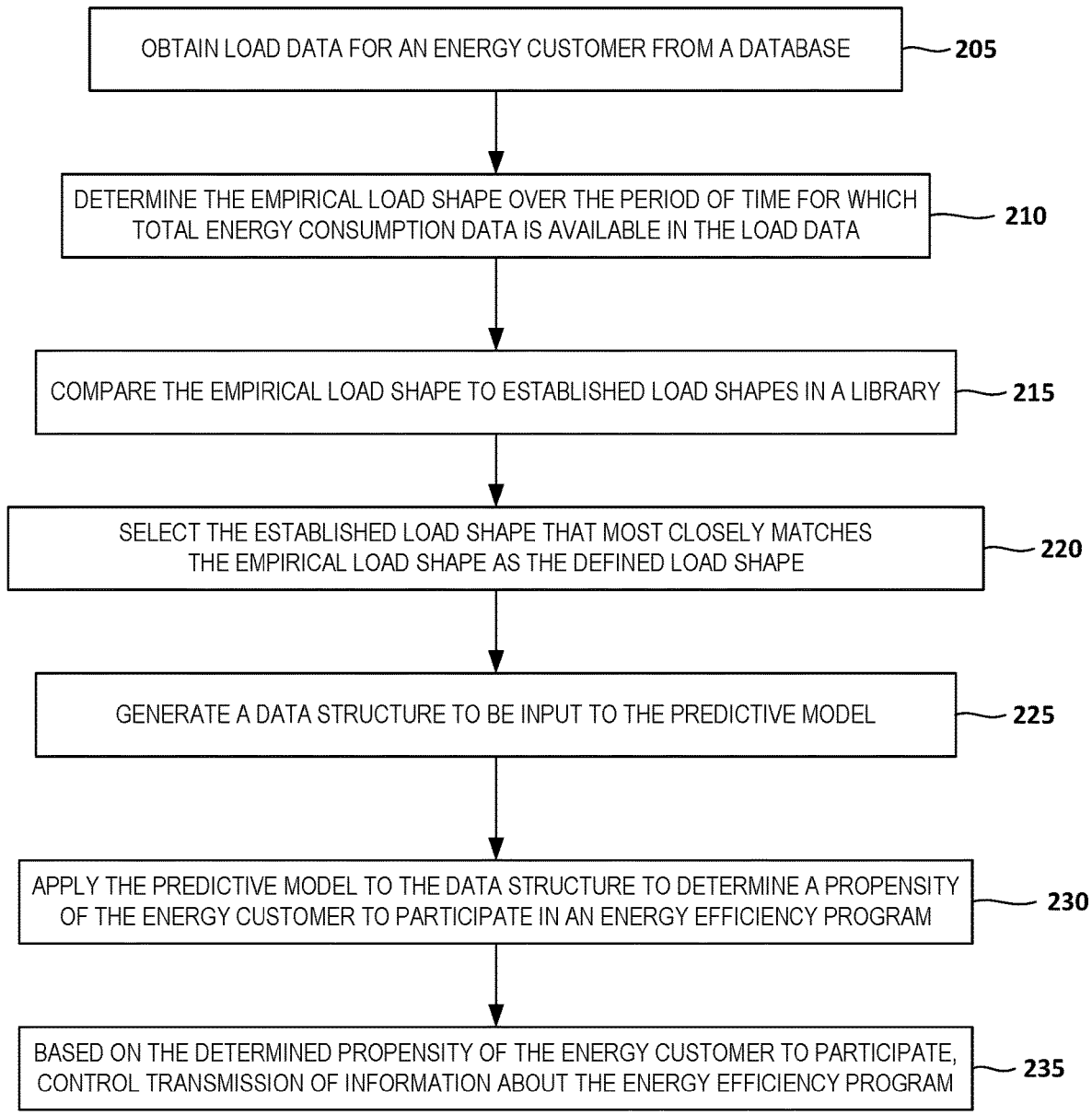
FIG. 2 illustrates a flow diagram schematically depicting an embodiment of a method of predicting a propensity of an energy customer to participate in an energy efficiency program with a computing system.

A flow diagram illustrating a method 200 of predicting a propensity of an energy customer to participate in an energy efficiency program using the system 100 is illustrated in FIG. 2. In response to the system 100 receiving a request to predict the propensity of the energy customer, the data management module 165 accesses the database 140 and obtains load data 145 for a dwelling 125 corresponding to the energy customer at step 205. The load data identifies, or can be used to determine the empirical load shape on a daily basis, for example.

With the load data 145 obtained by the data management module 165, the analysis module 170 determines an empirical load shape for the defined period (e.g., daily) at step 210. The empirical load shape represents the power consumed at the dwelling 125 over the period of time. As noted above, the period of time can be one day, one week, a two week period, one month or another desired period. The analysis module 170 compares the determined empirical load shape to the established load shapes in the library 155 at step 215. The analysis module 170 selects the established load shape that most closely matches the empirical load shape at step 220. For example, data values from the empirical load shape are compared to data values from one of the established load shapes (and repeated for other load shapes) and a matching function is based at least on a threshold value of difference in the values, based on any distance metric such as Euclidian distance, etc. The selected established load shape is identified as a defined load shape at step 220.

A data structure such as a feature vector for the energy customer is generated at step 225. The generated data structure includes values for parameters such as the established load shape that most closely matches the empirical load shape associated with the energy customer, demographic data and/or site parcel data that will form the input to the predictive model. With the analysis module 170 at step 230, determine that the energy customer is more likely to participate in an energy efficiency program than a different energy customer by applying the trained predictive model to the data structure. Determining the relative propensities of the energy customer and the different energy customer can involve comparing respective propensity values for the energy customer and the different energy customer. According to alternate embodiments, the determined propensity of the energy customer can be compared to a threshold value that separates a likely participant from an unlikely participant. According to yet other embodiments, the propensity can simply be determined for each of the energy customer and the different energy customer. These propensity values can later be presented to a user, to be manually compared by the user to determine the relative propensity of the energy customer and the different energy customer.

Based on the output from the analysis module 170, a transmission control module 185 transmits, modifies or generates data that controls transmission of information about the energy efficiency program to the energy customer at step 235. For example, the transmission control module 185 can prioritize a transmission of the information to the energy customer over a transmission of the information to the different energy customer. According to alternate embodiments, the transmission control module can cause the information about the energy efficiency program to be transmitted to the energy customer, but not the different energy customer.

Figure 3:
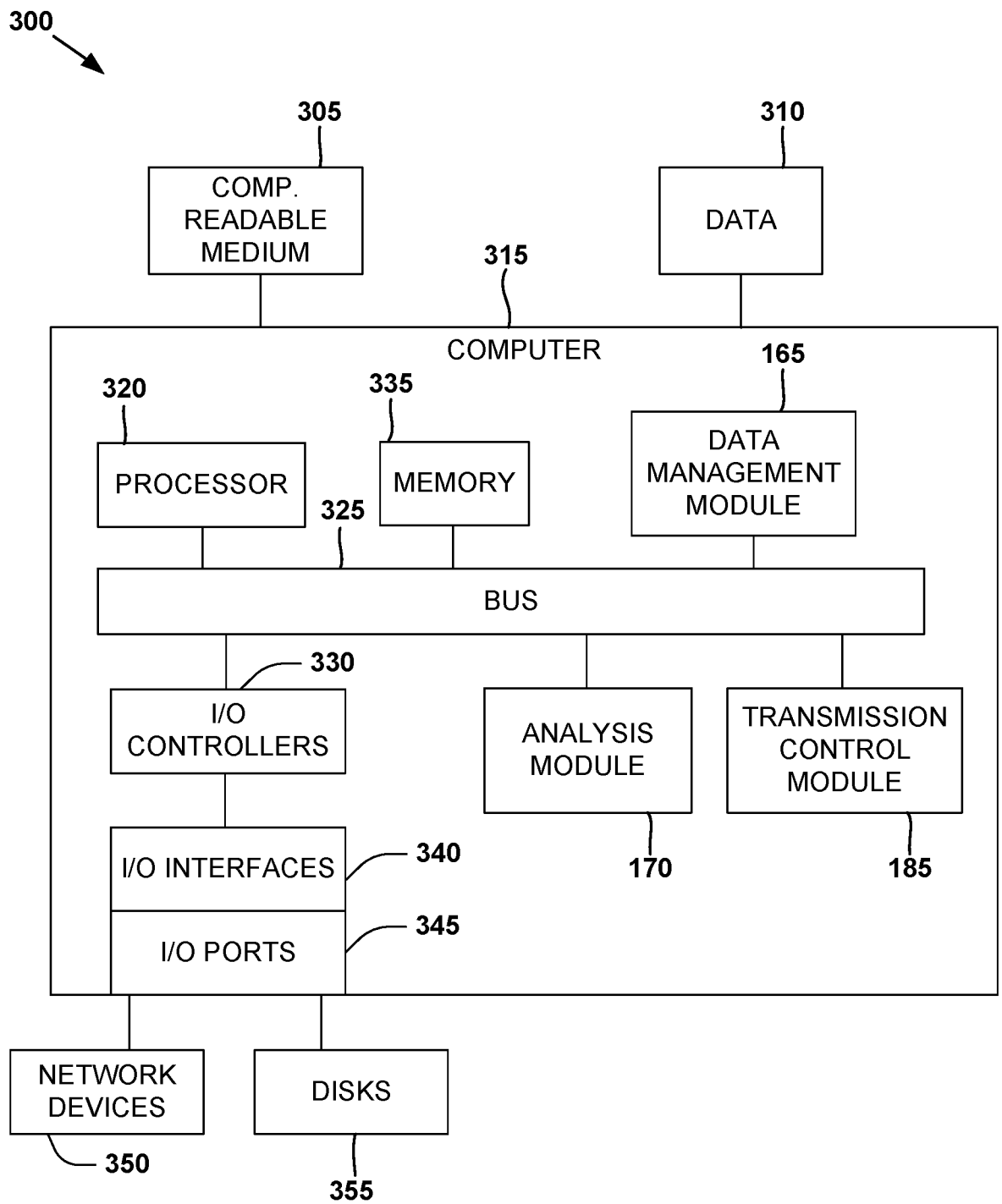
FIG. 3 illustrates an example computing device that is configured and/or programmed in accordance with one or more of the example systems and methods described herein.

FIG. 3 illustrates an example of a computing device 300 that is configured and/or programmed with one or more of the example systems and methods described herein, and/or equivalents. The illustrative example of a computing device 300 may be a computer 315 that includes a processor 320, a memory 335, and I/O ports 345 operably connected by a bus 325. In one embodiment, the computer 315 may include logic of the data management module 165, the analysis module 170, and the transmission control module 185, configured to facilitate the system 100 and/or the method described with respect to FIGS. 1 and 2. In different embodiments, the logic of the data management module 165, the analysis module 170, and the transmission control module 185 may be implemented in hardware, a non-transitory computer-readable medium 305 with stored instructions, firmware, and/or combinations thereof. While the logic of the data management module 165, the analysis module 170, and the transmission control module 185 is illustrated as a hardware component attached to the bus 325, it is to be appreciated that in other embodiments, the logic of one or more of these modules could be implemented in the processor 320, stored in memory 335, or stored in disk 355.

In one embodiment, logic of the data management module 165, the analysis module 170, and the transmission control module 185, or the computer 315 is a means (e.g., structure: hardware, non-transitory computer-readable medium, firmware) for performing the actions described. In some embodiments, the computing device 300 may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation.

The means may also be implemented as stored computer executable instructions that are presented to computer 315 as data 310 that are temporarily stored in memory 335 and then executed by processor 320.

The logic of the data management module 165, the analysis module 170, and the transmission control module 185 may also provide means (e.g., hardware, non-transitory computer-readable medium 305 that stores executable instructions, firmware) for performing rule based source sequencing for allocation.

Generally describing an example configuration of the computer 315, the processor 320 may be a variety of various processors including dual microprocessor and other multi-processor architectures. The memory 335 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 355 may be operably connected to the computer 315 via, for example, the I/O interface 340 (e.g., card, device) and the I/O ports 345. The disks 355 may be, for example, a magnetic disk drive, a solid state disk drive, a floppy disk drive, a tape drive, a Zip drive, a flash memory card, a memory stick, and so on. Furthermore, the disks 355 may be a CD-ROM drive, a CD-R drive, a CD-RW drive, a DVD ROM, and so on. The memory 335 can store a process, such as within the non-transitory computer-readable medium 305, and/or data 310, for example. The disk 355 and/or the memory 335 can store an operating system that controls and allocates resources of the computer 315.

The computer 315 may interact with input/output (I/O) devices via the I/O interfaces 340 and the I/O ports 345. The I/O devices may be, for example, a keyboard, a microphone, a pointing and selection device, cameras, video cards, displays, the disks 355, the network devices 350, and so on. The I/O ports 345 may include, for example, serial ports, parallel ports, and USB ports. I/O controllers 330 may connect the I/O interfaces 340 to the bus 325.

The computer 315 can operate in a network environment and thus may be connected to the network devices 350 via the I/O interfaces 340, and/or the I/O ports 345. Through the network devices 350, the computer 315 may interact with a network. Through the network, the computer 315 may be logically connected to remote computers (e.g., the computer 315 may reside within a distributed computing environment to which clients may connect). Networks with which the computer 315 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure" or "data object", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons who consume energy from a utility, computers or other devices operated by or on behalf of such persons, or combinations thereof.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least one processor of a computing system cause the at least one processor to:
    generate a plurality of established load shapes, wherein each established load shape represents an energy consumption pattern of a dwelling type over a time period based on observed energy consumption data;
    input a training set of data including data records from a plurality of energy customers, wherein a data record for a given energy customer includes at least (i) a load shape based on power consumed by the given energy customer over the time period, and (ii) participation data that indicates that the given energy customer is a known participant in an energy program or a known non-participant;
    separate, by the processor, the data records into subset records that correspond to one of the plurality of established load shapes based on the load shape from a given data record that matches one of the plurality of established load shapes;
    generate a first data structure for each given energy customer of the plurality of energy customers comprising a combination of the matching established load shape, a binary label of the participation data indicating whether or not the given energy customer is a participant in an energy efficiency program, demographic data associated with the given energy customer, and site parcel data associated with the given energy customer, wherein the site parcel data comprises at least one of: square footage, number of floors, dwelling type, or heat type;
    train a predictive model by machine learning to classify each of the plurality of energy customers in the training set of data into (i) a class of customers who are likely to participate in an energy efficiency program, or (ii) a class of customers who are unlikely to participate in the energy efficiency program;
    wherein the classifying is based, at least in part, on each of the first data structures associated with the plurality of energy customers in the training set of data and the binary label associated with a given energy customer;
    in response to a request to predict a propensity to participate in the energy program for a target group of energy customers who are known to be non-participants in the energy efficiency program:
        obtain, from the database, load data for each customer of the target group of energy customers who are known to be non-participants, wherein the load data for a given target energy customer is indicative of power consumed by the given target energy customer over the specified period of time;
    generate an empirical load shape for each given target energy customer from the target group based on the obtained load data for the given target energy customer, the empirical load shape representing the power consumed by the given target energy customer over the specified period of time;

compare, by the processor, the empirical load shape for each given target energy customer to the plurality of established load shapes and select a matching established load shape;

generate, by the processor, a data record for each given target energy customer, comprising a combination of the matching established load shape, and parameters associated with the given target energy customer including one or more of (i) the load data, (ii) demographic data, and (iii) site parcel data comprising one or more of: square footage, dwelling type, or heat type;

apply the predictive model to the data records of the target group of energy customers to identify a final set of non-participants who are likely to participate in the energy efficiency program, comprising:

input the data records of each given target energy customer into the predictive model;

for a given data record, compare similarities between the parameters in the given data record to the training set of data based on the matching established load shape and the subset records that correspond to the matching established load shape which include the participation data;

generate a predicted propensity to participate in the energy program for each given target energy customer based on the comparison with the subset of records from the training set of data; and filter the data records of the target group of energy customers according to the predicted propensity, wherein the data records that are likely to participate are included in the final set of non-participants who are likely to participate and data records not likely to participate are not included;

upon determining the final set of non-participants who are likely to participate in the energy efficiency program, generate an electronic message having information about the energy efficiency program; and control, by the processor, a transmission of the electronic message based on the determined final set of non-participants, where the electronic message is transmitted to an electronic contact information associated with the target energy customers within the final set of non-participants.

2. The non-transitory computer-readable medium of claim 1, wherein the predictive model is a binary classifier, and the computer-executable instructions when executed by the at least one processor of the computing system cause the at least one processor to use the binary classifier to:

classify the energy customer into a class of customers who are likely to participate in the energy efficiency program, and classify each of the given target energy customer from the target group into a class of customers who are unlikely to participate in the energy efficiency program.

3. The non-transitory computer-readable medium of claim 2, wherein the binary classifier is a logistic regression model that classifies the energy customer and each given target energy customer from the target group.

4. The non-transitory computer-readable medium of claim 1, wherein the load data obtained from the database comprises a total power consumption by the energy customer and each given target energy customer from the target group for each of a plurality of different days, and the empirical load shape represents a pattern of total power consumption by each given target energy customer from the target group on a daily basis.

5. The non-transitory computer-readable medium of claim 1, further comprising instructions that when executed by at the at least one processor cause the at least one processor to prevent a second transmission of the information about the energy efficiency program to each given target energy customer from the target group who are known to be non-participants.

6. A computing system, comprising:

at least one processor connected to at least one memory;

a data management module stored on a non-transitory computer readable medium and including instructions that when executed by the at least one processor cause the computing system to generate a plurality of established load shapes, wherein each established load shape represents an energy consumption pattern of a dwelling type over a time period based on observed energy consumption data;

an analysis module stored on the non-transitory computer readable medium and including instructions that when executed by the at least one processor cause the computing system to:

input a training set of data including data records from a plurality of energy customers, wherein a data record for a given energy customer includes at least (i) a load shape based on power consumed by the given energy customer over the time period, and (ii) participation data that indicates that the given energy customer is a known participant in an energy program or a known non-participant;

separate, by the processor, the data records into subset records that correspond to one of the plurality of established load shapes based on the load shape from a given data record that matches one of the plurality of established load shapes;

generate a first data structure for each given energy customer of the plurality of energy customers comprising a combination of the matching established load shape, a binary label of the participation data indicating whether or not the given energy customer is a participant in an energy efficiency program, demographic data associated with the given energy customer, and site parcel data associated with the given energy customer, wherein the site parcel data comprises at least one of: square footage, number of floors, dwelling type, or heat type;

train a predictive model by machine learning to classify each of the plurality of energy customers in the training set of data into (i) a class of customers who are likely to participate in an energy efficiency program, or (ii) a class of customers who are unlikely to participate in the energy efficiency program;

wherein the classifying is based, at least in part, on each of the first data structures associated with the plurality of energy customers in the training set of data and the binary label associated with a given energy customer;

in response to a request to predict a propensity to participate in the energy program for a target group of energy customers who are known to be non-participants in the energy efficiency program:

obtain, from the database, load data for each customer of the target group of energy customers who are known to be non-participants, wherein the load data for a given target energy customer is indicative of power consumed by the given target energy customer over the specified period of time;

generate an empirical load shape for each given target energy customer from the target group based on the obtained load data for the given target energy customer, the empirical load shape representing the power consumed by the given target energy customer over the specified period of time;

compare, by the processor, the empirical load shape for each given target energy customer to the plurality of established load shapes and select a matching established load shape;

generate, by the processor, a data record for each given target energy customer, comprising a combination of the matching established load shape, and parameters associated with the given target energy customer including one or more of (i) the load data, (ii) demographic data, and (iii) site parcel data comprising one or more of: square footage, dwelling type, or heat type;

apply the predictive model to the data records of the target group of energy customers to identify a final set of non-participants who are likely to participate in the energy efficiency program, comprising:

input the data records of each given target energy customer into the predictive model;

for a given data record, compare similarities between the parameters in the given data record to the training set of data based on the matching established load shape and the subset records that correspond to the matching established load shape which include the participation data;

generate a predicted propensity to participate in the energy program for each given target energy customer based on the comparison with the subset of records from the training set of data; and filter the data records of the target group of energy customers according to the predicted propensity, wherein the data records that are likely to participate are included in the final set of non-participants who are likely to participate and data records not likely to participate are not included;

upon determining the final set of non-participants who are likely to participate in the energy efficiency program, generate an electronic message having information about the energy efficiency program; and a transmission control module stored on the non-transitory computer readable medium and including instructions that when executed by the at least one processor cause the computing system to control, by the processor, a transmission of the electronic message based on the determined final set of non-participants, where the electronic message is transmitted to an electronic contact information associated with the target energy customers within the final set of non-participants.

7. The computing system of claim 6, wherein the predictive model is a binary classifier, and the analysis module further includes instructions that when executed by the at least one processor cause the computing system to:

classify the energy customer into a class of customers who are likely to participate in the energy efficiency program, and classify each of the given target energy customer from the target group customer into a class of customers who are unlikely to participate in the energy efficiency program.

8. The computing system of claim 7, wherein the binary classifier is a logistic regression model that classifies the energy customer and each given target energy customer from the target group.

9. The computing system of claim 6, wherein the database is in communication, over a communication network, with a meter provided to measure the obtained load data for a dwelling associated with the energy customer and a dwelling associated with each given target energy customer from the target group, and stores measurements taken by the meter that are received over the communication network.

10. The computing system of claim 6, wherein the load data stored by the database and obtained by the data management module comprises a total power consumption of the energy customer and each given target energy customer from the target group during different days, and the instructions of the analysis module generate the empirical load shape to represent a pattern of total power consumption by each given target energy customer from the target group on a daily basis.

11. The computing system of claim 6, wherein the transmission control module further includes instructions that when executed by the at least one processor cause the computing system to prevent a second transmission of the information about the energy efficiency program to each given target energy customer from the target group who are known to be non-participants.

12. A computer-implemented method, the method comprising:

generating a plurality of established load shapes, wherein each established load shape represents an energy consumption pattern of a dwelling type over a time period based on observed energy consumption data;

inputting a training set of data including data records from a plurality of energy customers, wherein a data record for a given energy customer includes at least (i) a load shape based on power consumed by the given energy customer over the time period, and (ii) participation data that indicates that the given energy customer is a known participant in an energy program or a known non-participant;

separating, by the processor, the data records into subset records that correspond to one of the plurality of established load shapes based on the load shape from a given data record that matches one of the plurality of established load shapes;

generating a first data structure for each given energy customer of the plurality of energy customers comprising a combination of the matching established load shape, a binary label of the participation data indicating whether or not the given energy customer is a participant in an energy efficiency program, demographic data associated with the given energy customer, and site parcel data associated with the given energy customer, wherein the site parcel data comprises at least one of: square footage, number of floors, dwelling type, or heat type;

training a predictive model by machine learning to classify each of the plurality of energy customers in the training set of data into (i) a class of customers who are likely to participate in an energy efficiency program, or (ii) a class of customers who are unlikely to participate in the energy efficiency program;

wherein the classifying is based, at least in part, on each of the first data structures associated with the plurality of energy customers in the training set of data and the binary label associated with a given energy customer;

in response to a request to predict a propensity to participate in the energy program for a target group of energy customers who are known to be non-participants in the energy efficiency program:

obtaining, from the database, load data for each customer of the target group of energy customers who are known to be non-participants, wherein the load data for a given target energy customer is indicative of power consumed by the given target energy customer over the specified period of time;

generating an empirical load shape for each given target energy customer from the target group based on the obtained load data for the given target energy customer, the empirical load shape representing the power consumed by the given target energy customer over the specified period of time;

comparing, by the processor, the empirical load shape for each given target energy customer to the plurality of established load shapes and select a matching established load shape;

generating, by the processor, a data record for each given target energy customer, comprising a combination of the matching established load shape, and parameters associated with the given target energy customer including one or more of (i) the load data, (ii) demographic data, and (iii) site parcel data comprising one or more of: square footage, dwelling type, or heat type;

applying the predictive model to the data records of the target group of energy customers to identify a final set of non-participants who are likely to participate in the energy efficiency program, comprising:

inputting the data records of each given target energy customer into the predictive model;

for a given data record, comparing similarities between the parameters in the given data record to the training set of data based on the matching established load shape and the subset records that correspond to the matching established load shape which include the participation data;

generating a predicted propensity to participate in the energy program for each given target energy customer based on the comparison with the subset of records from the training set of data; and filtering the data records of the target group of energy customers according to the predicted propensity, wherein the data records that are likely to participate are included in the final set of non-participants who are likely to participate and data records not likely to participate are not included;

upon determining the final set of non-participants who are likely to participate in the energy efficiency program, generating an electronic message having information about the energy efficiency program; and controlling, by the processor, a transmission of the electronic message based on the determined final set of non-participants, where the electronic message is transmitted to an electronic contact information associated with the target energy customers within the final set of non-participants.

13. The computer-implemented method of claim 12, wherein the predictive model is a binary classifier, and determining that the energy customer is more likely to participate in the energy efficiency program than the different energy customer comprises:

classifying the energy customer into a class of customers who are likely to participate in the energy efficiency program, and classifying each of the given target energy customer from the target group into a class of customers who are unlikely to participate in the energy efficiency program.

14. The computer-implemented method of claim 12, wherein the load data obtained from the database comprises a total power consumption by the energy customer and each given target energy customer from the target group for each of a plurality of different days, and determining the empirical load shape for each given target energy customer from the target group comprises determining a pattern of total power consumption by each given target energy customer from the target group on a daily basis.

15. The computer-implemented method of claim 12, further comprising preventing a second transmission of the information about the energy efficiency program to each given target energy customer from the target group who are known to be non-participants.

* * * * *